Jan. 5, 1932.  H. W. FLETCHER  1,839,387
UNIT ROLLER BIT HEAD AND CUTTERS
Filed March 9, 1931
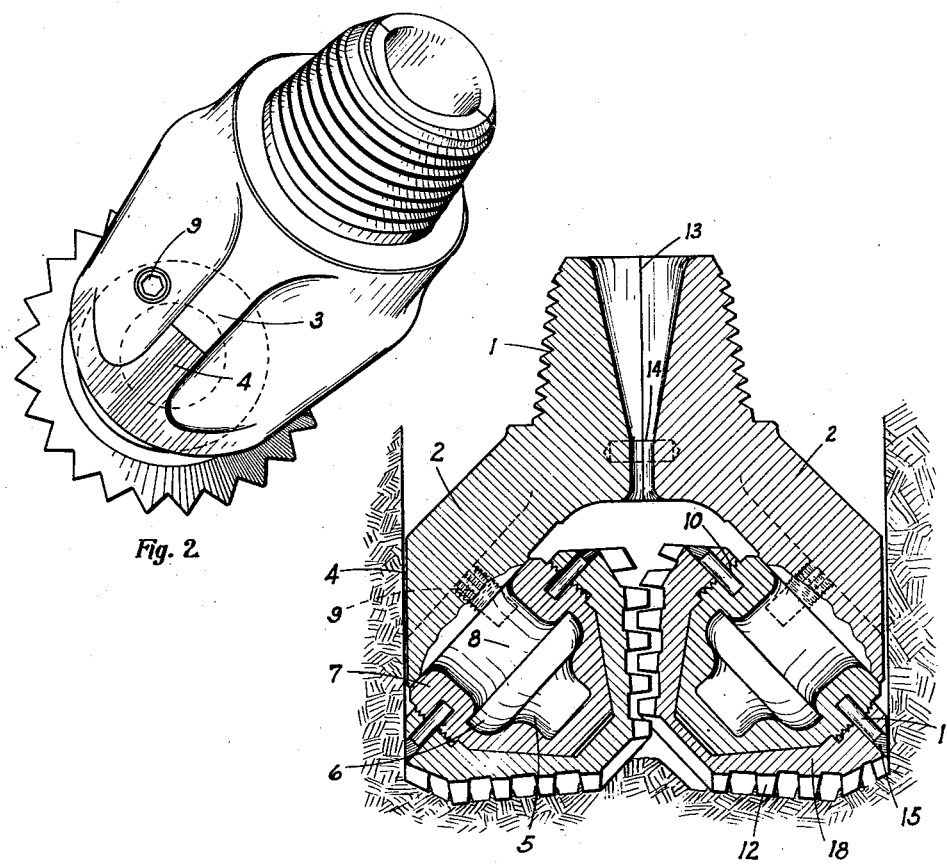
HAROLD W. FLETCHER INVENTOR
BY Jesse R. Stone
ATTORNEY Patented Jan. 5, 1932

1,839,387

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

UNIT ROLLER BIT HEAD AND CUTTERS

Application filed March 9, 1931. Serial No. 521,104.

My invention relates to rotary well drills having roller cutters thereon and pertains particularly to well drills of this character designed to cut hard formation.

It is an object of the invention to provide a drill head of simple and light construction upon which the cutters may be secured, said head being designed to be used but a short time and then discarded.

I also desire to mount the cutters upon the head in the shop, forming a unitary structure of the cutters with the said drill head, it being intended that the head may be junked with the cutters when said cutters are dull and worn out.

I wish to produce a roller drill in which both the head and cutters are of cheap, yet durable construction, and which may be returned as a unit when the cutters are worn out. The tool is designed for simplicity, cheapness and strength.

In the drawings herewith Fig. 1 is a central vertical section through a drill embodying my invention.

Fig. 2 is a perspective view of the same.

The head of the drill is of as light construction as may be consistent with required strength. It has an upper shank 1 threaded to engage with the drill collar or tool joint. Its lower end is forked to provide two outwardly inclined legs 2. These legs are flattened but have a reinforcing web or ridge 3, the outer end of which extends parallel with the wall of the hole at 4, to provide a wear surface.

Each leg has an integral cutter shaft 5 formed thereon projecting inwardly at approximately right angles to the inner face of the leg. Each of said shafts has a radial flange 6 between its ends to engage the bushing 7 and hold said bushing rotatably on the shaft. The rearward side of said flange is formed with a shoulder 8 thereon, but the forward side is rounded and tapered outwardly.

The bushing 7 is cast in position about said shaft and within a mold shaped to fit within the cutter 18. The mold is placed in position spaced accurately relative to the shaft, and the bushing is cast about the shaft. A removable dowel pin 9 is screwed through an opening in the head and has its inner end projecting from the inner side of the leg so as to form a recess in the bushing when said bushing is cast in place. The mold is removed and the bushing then machined and threaded at the base 10 so that the cutter may be screwed thereon. Opposite radial openings are formed in the bushing to receive dowel pins 11.

The cutter 18 is of approximately frustoconical shape with teeth 12 on its outer surface, the inner portion being recessed to fit the bushing 7, and the base is threaded to engage the threaded area 10 of the bushing. It will be seen that the two cutters have mating teeth which may interfit along the axis of the drill. The head is split longitudinally as shown at 13, and dowels 14 are employed between the meeting faces of the two halves of the head so that they may be registered in position to receive the drill collar by means of which the two halves of the head are secured together in use.

In assembling the cutters and bushings, the bushing being cast in position on the shaft may be of any desired bearing material. After they are cooled and machined they are pounded loose from the shafts and rotated, so that when the cutters are mounted thereon, the cutter and bushing may be locked together by the dowel pins 11 held in place by a bond 15 of welding material. The pin or screw 9 is fitted into the bushing while the cutter is screwed in position on the bushing but will be removed when the cutter is secured in place, thus allowing the bushing to rotate on the shaft.

The cutter may work on the bushing with or without lubrication. I contemplate, however, the use of any type of lubricating device which may be desired, none being shown for purposes of clearness.

The tool thus formed is of strong, yet light construction and may be made of a minimum of material and sold at prices within the reach of the ordinary driller. When the cutters are worn out, the complete tool may be thrown away or the cutters may be removed by the use of a cutting torch and new cutters assembled with new bushings on the shaft as has been already described.

What I claim as new is:

1. A roller well drill comprising a head, to opposed shafts integral therewith, a bushing cast about each of said shafts to rotate thereon, and a cutter secured upon said bushing and rotatable therewith.

2. A roller well drill comprising a longitudinally divided head, downwardly inclined shafts thereon, a radial projection on each shaft, an approximately frusto-conical bushing cast about said shaft, and a cutter secured upon said bushing.

3. A roller well drill including a head, the lower end of which is forked to form two outwardly inclined legs, shafts on said legs, each shaft having a radial flange thereon between its ends, a bushing cast about said shaft to rotate thereon, and a cutter on said bushing and rotatable with said bushing on said shaft.

4. A roller well drill including a head, a shaft projecting therefrom, a bushing surrounding the end of said shaft and enclosing the same, means on said shaft engaging said bushing to hold it rotatable thereon, and a cutter fixed removably on said bushing.

5. A roller well drill including a head, a cutter shaft thereon, said shaft being enlarged adjacent its outer end, a bushing cast about and enclosing the end of said shaft so as to rotate thereon, and a toothed cutter fitting about the end of said bushing and fixed thereto.

6. A roller well drill including a supporting head, downwardly inclined cutter shafts on said head, an enlargement on said shaft spaced from the inner end thereof, a bushing surrounding the end of said shaft and cast on said shaft to fit rotatably thereon, a toothed cutter fitting about said bushing and means securing said cutter and bushing nonrotatably together.

7. A unitary roller well drill including a head, cutter shafts projecting therefrom, flanges projecting from said shafts, bushings cast about the ends of said shafts and enclosing the same and adapted to rotate thereon, and a cutter fitting about said bushing and rotatable therewith.

8. A head comprising a shank and two outwardly forked legs, a shaft on each of said legs, radial projections on said shafts, bushings cast integrally about said shafts and rotatable thereon, and cutters on said bushings, said cutters having teeth thereon adapted to interfit in use.

In testimony whereof, I hereunto affix my signature this, the 25th day of February, A. D. 1931.

HAROLD W. FLETCHER.